June 7, 1960     C. G. ANDERSSON ET AL     2,939,214
TOOL AND METHOD OF MAKING SAME
Filed April 13, 1959
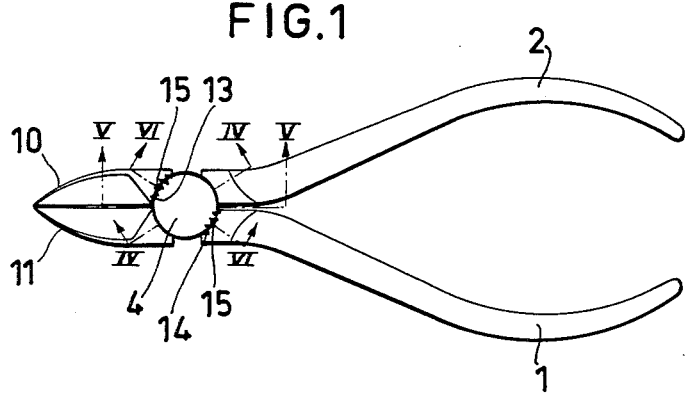
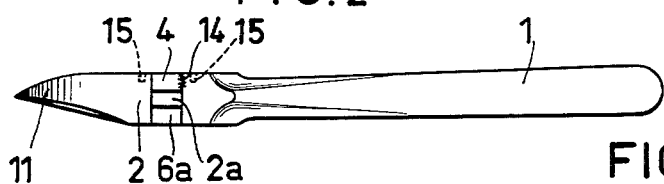
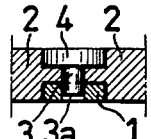
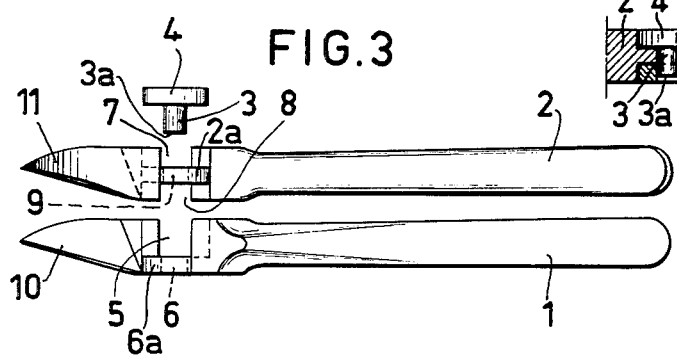
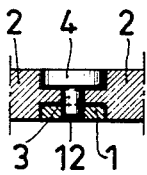 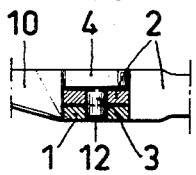 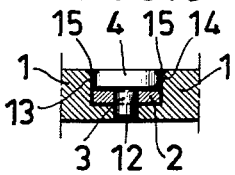
Inventors:
Carl Gustav Andersson
Georg Erik Hjalmar Ekström
Attorney

United States Patent Office 2,939,214
Patented June 7, 1960

2,939,214

TOOL AND METHOD OF MAKING SAME

Carl Gustav Andersson and Georg Erik Hjalmar Ekstrom, Eskilstuna, Sweden, assignors to E. A. Bergs Fabriks Aktiebolag, Eskilstuna, Sweden Filed Apr. 13, 1959, Ser. No. 806,163

Claims priority, application Sweden Sept. 2, 1953

6 Claims. (Cl. 30—266)

This invention relates to an improved tool and the method of manufacturing tools of this type, such as pliers, cutters, tongs and the like, having two shanks, interconnected by means of a joint, and this application is a continuation-in-part of our application Serial No. 399,808, filed December 2, 1953, now abandoned. In such tools, the two shanks are pivotable in relation to each other around an axis in the joint, and each shank or handle member carries a jaw.

The invention also refers to a tool of this type.

The chief purpose of this invention is to render such joints stronger and more resistant to stresses, without using more material (metal) in the joint.

Another purpose of this invention is to render it possible to manufacture such joints of the box type in a simpler and less expensive manner than was heretofore possible.

A further purpose of this invention is to construct such joints with a central pivot without any riveting, thus avoiding the risk of the joint becoming jammed or loose, if the rivet is struck with too hard or too little force, which it is often impossible to avoid in the process of manufacture. Other well-known drawbacks of riveted joints are simultaneously eliminated.

Another purpose of this invention is to make the joint very simple and easy to manufacture by means of ordinary machine tools, using a minimum number of parts in the joints and rendering the parts very simple.

Another purpose of this invention is to eliminate the necessity of boring countersunk recesses for rivet heads.

Other purposes will be evident from the following specification.

One preferred embodiment of the invention is illustrated in the accompanying drawings, in which:

Fig. 1 shows a plan view of a side cutter having a joint in accordance with this invention.

Fig. 2 is a side view of the cutter shown in Fig. 1.

Fig. 3 is an exploded view of the three parts of the same cutter.

Fig. 4 is a sectional view on the line IV—IV in Fig. 1.

Fig. 4a is a view similar to Fig. 4, omitting one manufacturing step.

Fig. 5 is a sectional view on the line V—V of Fig. 1.

Fig. 6 is a sectional view on the line VI—VI of Fig. 1.

Referring now to the drawings, the side cutter shown therein has an outer member or box shank 1 and an inner shank member 2 forming handle members. The shank or handle members 1 and 2 are pivotally connected by means of a headed fastener member including a pivot or stud 3.

Into the joint portion of the outer shank 1 a cylindrical recess 5 of uniform diameter is drilled and coaxially therewith a cylindrical hole 6 is bored through the remaining wall part 6a or web of the shank 1. The recess 5 and the hole 6 may be drilled in one single operation by means of a counterbore.

On both sides of the inner shank 2 coaxial cylindrical recesses 7 and 8 are bored, and coaxially with them a hole 9 is bored through the central portion 2a or web remaining between the two recesses. The web 2a has a slightly smaller diameter than the recess 5 so as to fit movably therein. The holes 6 and 9 have the same diameter and the pivot 3 fits in them when the parts are assembled.

One of the recesses 7 or 8 may be drilled in one and the same operation with the hole 9.

It might be mentoined here that the two recesses 7 and 8 of the inner shank 2 are not necessary; in some cases the hole 9 might be drilled right through the shank 2 without any recesses.

The head 4 of the fastener member is of such a diameter that it fits snugly in the recess 5 of the outer shank 1.

The shanks 1 and 2 have jaws 10 and 11, respectively. In the embodiment shown, these jaws are shaped as diagonal side cutter jaws. This, however, is merely by way of illustration, as the jaws will be shaped in accordance with the intended use of the tool, for instance, as pliers, tongs, tweezers, or otherwise.

When the two shanks 1 and 2 and the pivot stud 3, are to be assembled, the joint of the inner shank 2 is inserted into the joint of the recess 5 of the outer shank 1. Then the headed stud 3 is passed through the registering coaxial holes 6 and 9, so that the head 4 is pushed down into the recess 5 of the outer shank 1, fitting simultaneously into the recess 7 of the shank 2.

The holes 6 and 9 have the same diameter and the pivot or stud 3 fits snugly into them, but the length of the stud 3 is less than overall thickness of the shanks 1 and 2 at that point so that the end 3a terminates short of the bottom wall of the tool, as seen in Fig. 4a.

Now the free end 3a of the pivot 3 is welded to the outer shank 1 as shown at 12 in Figs. 4, 5, and 6, and its head 4 is welded to the outer shank 1 as shown with jagged lines at 13 and 14 in Fig. 1. This weld joins the three parts into a unitary tool. To facilitate the welding and to render the weld stronger, it is preferred to drill shallow holes or countersunk conical recesses 15 into the washer 4 and the outer shank 1 at their abutting lines, as shown in Fig. 2. When the weld is made, these holes 15 are filled with the welding material, thereby firmly uniting the parts 1 and 4.

The welding junction 12 is on one flat side of the tool and the welding junctions 13 and 14 are on the opposite flat side thereof. Thus, the fastener member 3, 4, is integrally united to the shank member 1 on each face thereof.

When the welding is finished, the flat sides of the tool are ground to remove excess metal on the welded seams, and the tool is then given its final finish.

It is to be observed that no riveting is made in the joint. Thus, the usual risk that the rivet is struck too much or too little is eliminated. Too heavy striking of the rivet jams the joint, while too light striking renders a loose joint likely to cause the jaws to oscillate and spread. Stress is laid upon the fact that the length of the pivot 3 is by no means critical so long as it penetrates into the body 6a and terminates short of the bottom of the hole 6. The same also applies to the thickness of the head 4. In riveted joints, it is important that the rivet has an exact predetermined critical length.

In the finished joint, the inner shank 2 rotates on the pivot 3 and is firmly guided laterally (axially) by the head 4 on one side and the bottom of the recess 5 in the outer shank 1 on the other side. There is no risk of jamming or loosening because the parts fit snugly into each other and are firmly held by the welds, no striking of rivet heads being necessary for mounting and interconnecting the three elements, shanks 1 and 2 and headed stud 3 properly.

Having now described our invention, what we claim as new and desire to secure by Letters Patent is:

1. A method of manufacturing a pair of pliers of the box joint type, comprising, making an outer box shank with a joint portion and jaw, making an inner box shank with a joint portion and a jaw, boring holes of substantially the same diameter through the joint portions of said outer shank and said inner shank and forming a circular recess in said joint portion of said outer shank portion coaxially with the hole therein, forming a corresponding recess on each face of the joint portion of said inner shank with a web portion between said recesses, forming a cylindrical fastener member to fit snugly in the recess in said outer shank and forming a pivot integral with said member to fit snugly in the holes in said joint portions of said outer and inner shanks, placing said inner shank in the recess in said outer shank in such manner that the holes in said inner and outer shanks are coaxial, inserting said fastener member into the recess in said outer shank above said inner shank therein while simultaneously inserting said pivot into the coaxial holes in said outer shanks, and welding the outer, free end of said pivot to said outer shank.

2. A method of manufacturing a pair of pliers of the box joint type, comprising, making an outer box shank with a joint portion and a jaw, making an inner shank with a joint portion and a jaw, boring holes of substantially the same diameter through the joint portions of said outer shank and said inner shank and forming a circular recess in said outer shank portion coaxially with the hole therein, forming a corresponding recess on each face of the joint portion of said inner shank with a web portion between said recesses, forming a headed fastener member to fit snugly in the recess in said outer shank and forming a pivot integral with said member to fit snugly in the holes in said joints of said outer and inner shanks, placing said inner shank joint in the recess in said outer shank joint in such manner that the holes in said inner and outer shanks are coaxial, inserting said fastener member into the recess in said outer shank above the web of said inner shank therein while simultaneously inserting said pivot into the coaxial holes in said inner and outer shanks, welding both the head of said fastener member and the outer free end of said pivot to said outer shank, and finishing said welded surfaces.

3. In a tool of the pliers type, a joint comprising in combination, an outer box shank having a circular recess of uniform diameter defined by a bottom and cylindrical side walls, and having a jaw, a cooperating second shank part having a circular web portion received in the recess of said first shank part, said second shank part having a cooperating jaw, said bottom and said web portion having coaxial bores of uniform diameter extending therethrough, and a headed fastener member pivotally connecting said shank portions, said headed fastener member including a stud portion having a uniform diameter, the head of said fastener member lying within said recess and over said web portion, the stud portion of said member extending through the bore of the underlying web portion and into the bore of the bottom portion of said first shank part, said fastener member being integrally united to said first shank member on each face of said shank.

4. A tool according to claim 3, in which said stud portion terminates short of the end of the bore of the bottom portion of said first shank member, leaving a recess therein, and a filling material in said last named recess integrally uniting said stud to said bore and shank.

5. A tool according to claim 3, in which the length of said stud portion extending into said bores is less than the combined thickness of the portions connected thereby of said first and second shank members, the end of said stud portion being integrally united to said first shank member.

6. A method of manufacturing a tool of the pliers type having a box joint comprising making an outer shank with a joint portion and a jaw, making an inner shank with a joint portion and a complementary jaw, forming holes of substantially the same diameter through the joint portions of said outer and inner shank, and forming a circular recess in the joint portion of said outer shank coaxially with the hole therein, forming a corresponding recess on each face of the joint portion of said inner shank leaving a web portion between said recesses, forming a cylindrical headed fastener member to fit closely in the recess of said outer shank and forming a pivot portion integrally with said head to fit closely in the holes of said outer and inner shanks, respectively, placing said web of said inner shank in the recess in said outer shank in such manner that the holes in said shanks are coaxial, inserting said pivot portion into the coaxial holes of said shanks and said head into the recess in said outer shank above said web, making recesses in the abutting edges of said head and said outer shank and filling these recesses with molten metal.

References Cited in the file of this patent

UNITED STATES PATENTS

| 832,200 | Kellemen et al. | Oct. 2, 1906 |
| 2,611,288 | Schiffbauer | Sept. 23, 1952 |

FOREIGN PATENTS

| 642,868 | Great Britain | Sept. 13, 1950 |